July 7, 1942.  W. F. HELWIG  2,288,623
ANTISKID DEVICE
Filed Dec. 2, 1940

Inventor
W. F. Helwig
By
Attorneys

Patented July 7, 1942

2,288,623

UNITED STATES PATENT OFFICE 2,288,623

ANTISKID DEVICE

William F. Helwig, Milwaukee, Wis.

Application December 2, 1940, Serial No. 368,139

1 Claim. (Cl. 24—193)

This invention appertains to anti-skid chains of the type wherein the road-engaging elements extend transversely across the tire, as shown in my application Serial No. 194,412, filed March 7, 1938, now Patent 2,223,824, granted December 3, 1940.

One of the primary objects of my invention is to provide a novel anti-skid chain of the above type, which will be easy to place on and remove from a tire, and which embodies novel means for receiving and holding the ends of the fastening strap of the appliance.

Another salient object of my invention is the provision of tire side wall engaging plates for carrying the chains or other anti-skid elements, with a novel locking buckle carried by one of said plates for adjustably and detachably receiving the fastening strap.

A further important object of my invention is the provision of a fastening buckle for the strap, including a locking cam buckle lever over which the strap is drawn, with novel means carried by the lever for detachable locking engagement with the plate, the buckle functioning to draw the strap to a tight adjusted position against accidental displacement.

With these and other objects in view, the invention consists in the novel construction, arrangement, and formation of parts, as will be hereinafter more specifically described, claimed, and illustrated in the accompanying drawing, in which drawing:

Referring to the drawing in detail, wherein similar reference characters designate corresponding parts throughout the several views, the letter D generally indicates my improved anti-skid device for a tire T.

The tire T can be of any preferred character or make, and is mounted in the usual manner on a rim R.

The anti-skid device D comprises tire side wall engaging plates 10 and 11. Each of these plates is formed from sheet metal of the desired gauge and carries the chains or other anti-skid elements 12. These plates are detachably connected together by the use of a flexible strap 13.

Figure 1:
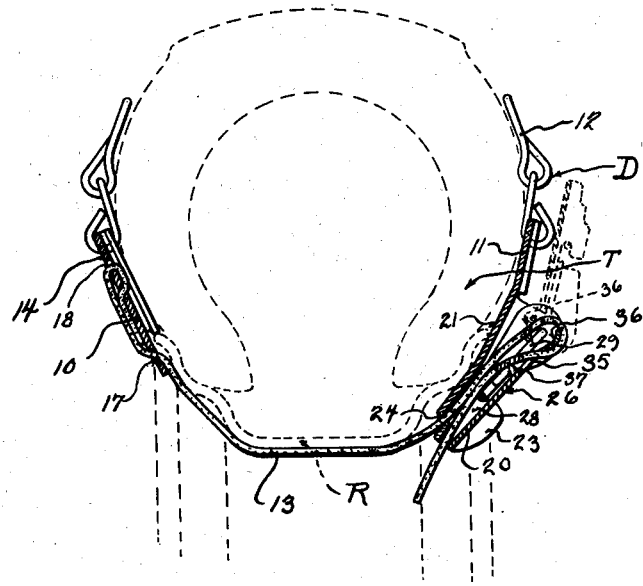
Figure 1 is a fragmentary, side, elevational view of my improved anti-skid device, showing parts thereof broken away and in section, the device being shown applied to a tire and a rim, the tire and rim being illustrated in dotted lines.

The side wall plate 10 includes a body portion 14, which is of a substantially U-shape in cross section, and this body portion has formed on its upper outer corners laterally extending ears 15 for receiving the terminals of the chains 12. The body 14 has preferably formed thereon a depending loop 16 provided with a transversely extending strap-receiving slot 17, and the body above the slot 17 is also provided with a pair of spaced parallel strap-receiving slots 18. The ends of the body above the loop 16 form means for engaging the rim R, as is clearly shown in Figure 1. One end of the strap 13 is threaded through the slots 18, and the strap is then brought down over the outer face of the plate into engagement with the adjacent end of the strap and then through the slot 17. The strap 13 is then adapted to be brought across the rim and is adapted to be detachably held in place on the plate 11 by the novel buckle construction 20, as will be described. A pull on the strap 13 tends to bind the strap against the various edges of the side wall plate 10, so as to prevent slipping of said strap.

Figure 2:
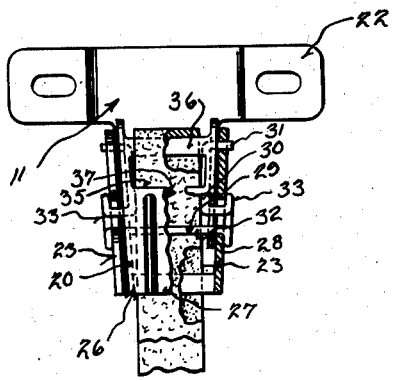
Figure 2 is a front, elevational view of one of the novel side wall engaging plates, showing the improved buckle means for the connecting strap, parts of the view being shown broken away and in section.
Figure 4:
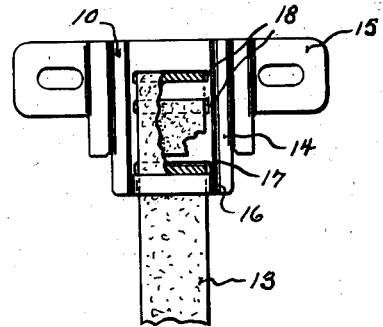
Figure 4 is a front, elevational view of the other tire side wall engaging plate.
Figure 3:
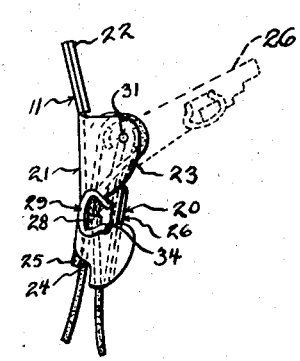
Figure 3 is a side, elevational view of the side wall plate shown in Figure 2 of the drawing.

The side wall plate 11 includes a depending body portion 21, having formed on its upper corners laterally extending ears 22 for receiving the anti-skid chains 12. The body portion 21 has formed on its sides forwardly extending, spaced side walls 23. These walls can converge slightly toward their inner ends, as shown in Figure 2.

The body 21 adjacent its lower end and between the side walls is provided with a strap-receiving slot 24, and the body is preferably struck out to provide a guide loop 25 on one side of the slot. This facilitates the threading of the strap through the body. The body 21 and its side walls 23 form a part of the buckle structure 20.

This buckle includes a locking cam buckle lever 26. The cam locking lever 26 embodies a front plate 27 and inwardly directed side flanges 28, which are adapted to lie between the side walls 23 of the body. Novel means is provided for rockably mounting the lever 26 on the body, and this means includes a supporting wire 29, which also functions as a latch element, as will be later set forth. The wire 29 is preferably of a resilient nature and includes spaced side leg portions 30, which terminate in oppositely extending, laterally disposed pivot arms 31. These pivot arms are adapted to extend through openings formed in the flanges 28 of the buckle lever and the side walls 23 of the body. The legs 30 can be sprung toward one another to facilitate the placing of the arms 31 through the openings formed in the flanges and side walls.

The legs 30 are connected by a crossbar portion 32, and this crossbar portion 32, in turn, has formed thereon resilient loops 33 at the ends thereof, and these loops extend through suitable slots or openings formed in the flanges 28 of the lever. These loops 30 are adapted to project laterally beyond the buckle lever, and when the buckle lever is in its lowered position, the crossbar 32 is adapted to snap into keeper notches 34 formed in the side walls 23 of the body. When the crossbar snaps into the keeper notches, accidental swinging movement of the buckle lever will be prevented.

The upper end of the buckle lever has formed therein a relatively wide slot 35, and this slot defines a crossbar 36 over which the strap 12 is adapted to extend. It is to be noted that the crossbar 36 is arranged at one side of the pivot of the buckle lever, for a purpose which will be later set forth. One edge of the slot 35 is provided with inwardly directed strap-engaging teeth or spurs 37.

In use of my appliance, one end of the strap is fastened to the plate 10, as heretofore described, and the appliance is placed on the tire, with the chains 12 extending transversly across the tread of the tire. The strap 12 is now pulled against the side wall plate 10 and is brought over the rim. It is then threaded through the slot 24 and brought into the body of the buckle. The strap is now brought around the upper end of the buckle over the crossbar 36, and the strap is again brought down into the body.

The buckle lever 26 is in its full raised position during the placing of the strap in the buckle, and the strap can be pulled tight in place to draw the chains into engagement with the tire tread. When a downward pull is exerted on the strap, the lever tends to swing back against the side wall plate 11 between the ears 22, and, consequently, danger of the buckle lever being forced prematurely to a closed position is prevented.

After the strap has been adjusted, the buckle lever is now swung forcibly down to a lowered position, and during the swinging of the lever, the crossbar 36 is brought up, which will place the strap 12 under further tension. As the buckle lever is moved between the side walls 23 of the body, the ends of the wire crossbar portion 32 will rise into the keeper notches 34, and all parts will be held against accidental movement. Obviously, as the lever is swung down, the teeth or spurs 37 formed thereon will bite into the strap 12 and further prevent slipping of the strap.

From the foregoing description it can be seen that I have provided a novel anti-skid device for automobile tires, in which all parts will be firmly and securely anchored onto the vehicle wheel.

Changes in details may be made without departing from the spirit or the scope of this invention, but what I claim as new is:

A buckle for securing a strap comprising a plate including a body portion, and outwardly projecting side walls, a buckle lever including a front plate and inwardly directed side flanges, said plate being provided adjacent its inner end with a fastening strap-receiving slot and a crossbar over which the strap is adapted to be placed, a pivot for said lever independent of the crossbar including spaced legs arranged adjacent the flanges having outwardly extending pivot arms, the side walls and said flanges being provided with alined openings for receiving the arms, a crossbar for said legs, and resilient loops connecting the crossbar and legs together, said loops projecting beyond the flanges, the side walls being provided with keeper notches for receiving the crosspiece when the lever is in its lowered closed position.

WILLIAM F. HELWIG.